United States Patent
Yamada

[11] Patent Number: 5,940,219
[45] Date of Patent: Aug. 17, 1999

[54] IMAGING LENS

[75] Inventor: Hiroshi Yamada, Omiya, Japan

[73] Assignee: Fuji Photo Optical Co., Ltd., Saitama, Japan

[21] Appl. No.: 09/050,378

[22] Filed: Mar. 31, 1998

[30] Foreign Application Priority Data

Apr. 30, 1997 [JP] Japan ................................. 9-126507

[51] Int. Cl.$^6$ .............................. G02B 3/00; G02B 25/00
[52] U.S. Cl. .......................................... 359/642; 359/645
[58] Field of Search ...................................... 359/642–645

[56] References Cited

U.S. PATENT DOCUMENTS 5,066,113  11/1991  Nakajima et al. ...................... 359/649

*Primary Examiner*—Georgia Epps
*Assistant Examiner*—Suzanne Letendre
*Attorney, Agent, or Firm*—Snider & Chao; Ronald R. Snider

[57] ABSTRACT

Each of first and second lenses, which are in meniscus forms with concave surfaces opposing each other, is made as a plastic lens having at least one aspheric surface, and the whole lens system has a three-sheet lens configuration, thereby achieving a smaller size and a lower cost, while making it easy to restrain focus from fluctuating upon changes in temperature. Disposed successively from the object side are a first lens $L_1$ in a low-power meniscus form made of a plastic having a convex surface directed onto the object side, whose both surfaces are aspherical; a second lens $L_2$ in a low-power meniscus form made of a plastic having a concave surface directed onto the object side, whose both surfaces are aspherical; and a third lens $L_3$ in a meniscus form made of a glass with a positive refracting power having a convex surface directed onto the object side. A luminous flux incident on the imaging lens from the object side along an optical axis X forms an image on an imaging surface (light-receiving surface of a solid-state imaging device) 1.

3 Claims, 3 Drawing Sheets

FIG. 1 EXAMPLE 1
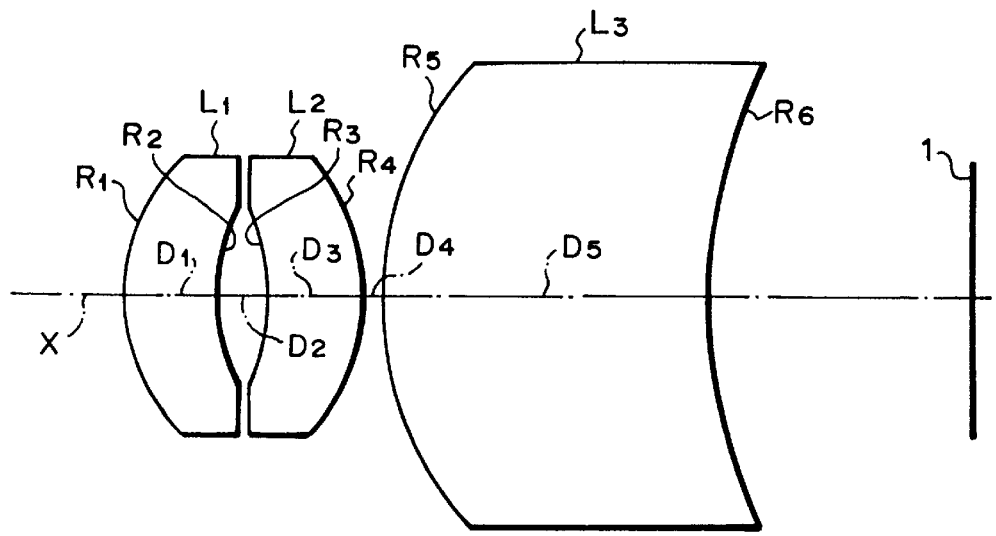
FIG. 2 EXAMPLE 2
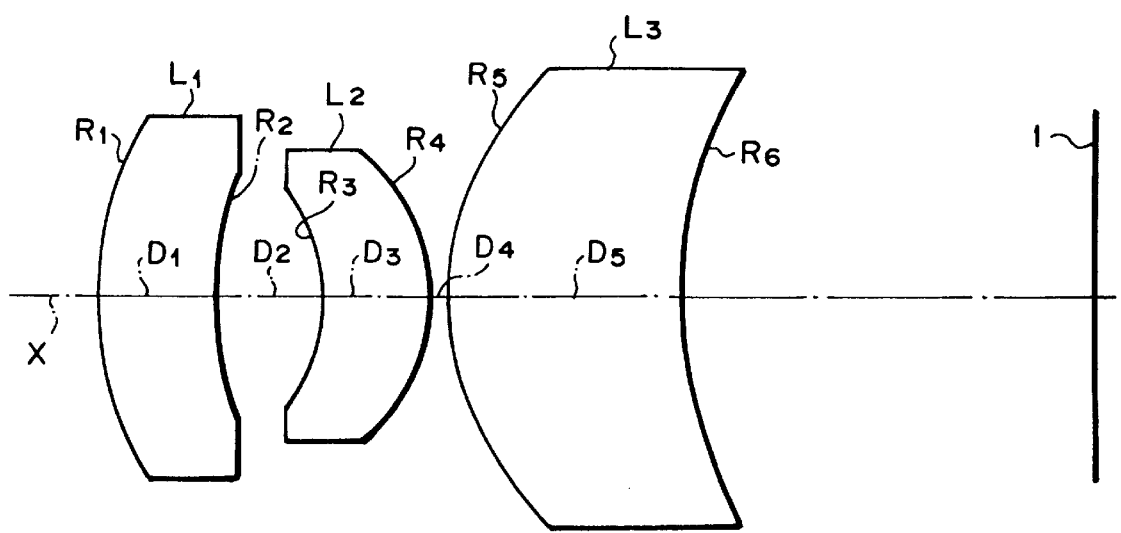

FIG.3C EXAMPLE 1 ω=21.5°
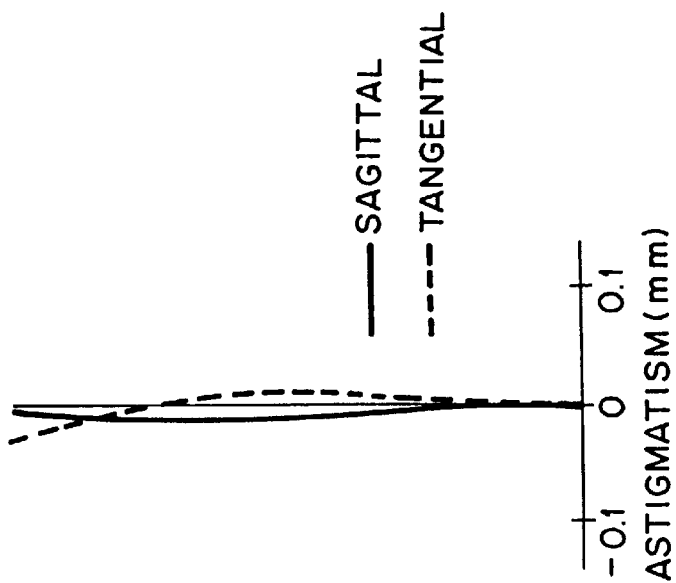
FIG.3B EXAMPLE 1 ω=21.5°
FIG.3A EXAMPLE 1 F/2.80

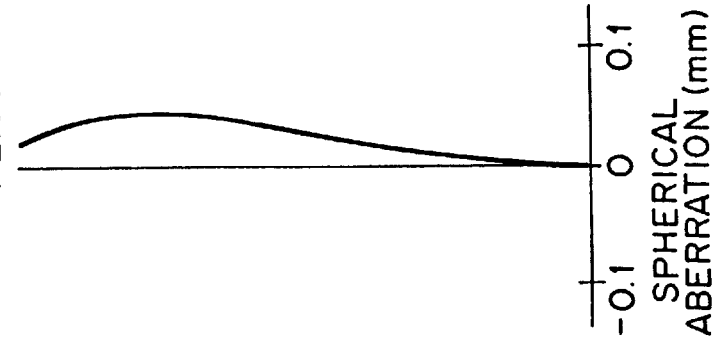

IMAGING LENS

RELATED APPLICATIONS

This application claims the priority of Japanese Patent Application No. 9-126507 filed on Apr. 30, 1997, which is incorporated herein by reference.

BACKGROUND OF THE INVENTION

1. Field of the Invention

The present invention relates to an imaging lens and, in particular, to an imaging lens applicable to a wide range of uses such as a taking lens for a video camera or still video camera used for TV phone, door phone, monitoring purposes, or the like, an imaging lens mounted in a scanner for capturing images for personal computers, and so forth.

2. Description of the Prior Art

Recently, solid-state imaging devices have often been disposed on imaging surfaces of various kinds of video cameras and still video cameras. With the advance of technology, such solid-state imaging devices have been reducing their size year by year, while requiring imaging lenses with smaller size. Also, there is an increasing demand for those with lower manufacturing cost.

Meanwhile, since the imaging lenses used for video camera or the like for TV phone, door phone, monitoring purposes, and so forth are required to attain compactness and lower cost in particular as mentioned above, many of them have been known to employ plastics as their lens-forming material.

When a plastic lens is employed, however, its focus greatly fluctuates upon changes in temperature in general, thus making it necessary to suppress such focus fluctuation. In order to restrain focus from fluctuating upon changes in temperature, a larger number of lens sheets must be employed, thereby increasing the size of the lens or its manufacturing cost. Therefore, though the necessity for taking account of temperature compensation in plastic lenses is recognized, there are many imaging lenses providing no means therefor.

Focus fluctuation upon changes in temperature can be corrected by refocusing, increasing Fno, restricting the usable temperature range, and so forth. Such means, however, are hard to be considered realistic. Thus, there has been a demand for developing a better technique therefor.

SUMMARY OF THE INVENTION

In view of such circumstances, it is an object of the present invention to provide an imaging lens with favorable imaging performances, which uses a plastic lens to attain a smaller size and a lower cost, while being capable of easily restraining focus from fluctuating upon changes in temperature.

The imaging lens in accordance with the present invention comprises, successively from an object side, a first lens in a low-power meniscus form made of a plastic, with a convex surface directed onto the object side, having at least one aspheric surface; a second lens in a low-power meniscus form made of a plastic, with a concave surface directed onto the object side, having at least one aspheric surface; and a third lens having a positive refracting power made of a glass.

Preferably, the first and second lenses respectively have concave surfaces opposing each other.

Preferably, the third lens is a meniscus lens having a convex surface directed onto the object side.

In the imaging lens in accordance with the present invention, while the first and second lenses are made as plastic lenses, their power is reduced so that a major part of power is carried by the third lens. Accordingly, while a compact three-sheet lens configuration is attained, focus fluctuation upon changes in temperature can be suppressed. Also, as each of the first and second lenses has at least one aspheric surface, spherical aberration and coma are favorably corrected, whereby a simple three-sheet lens configuration is achieved. Since these two lenses are made as plastic lenses, aspheric surfaces are formed easily and inexpensively.

In the imaging lens in accordance with the present invention, the convex surface of the first lens is directed onto the object side. When the concave surface is directed onto the object side, by contrast, negative distortion enhances so much that it becomes necessary to employ a larger number of lens sheets in order to correct the distortion, thus elongating the whole lens system, which increases the size and cost of the apparatus. Such a problem is prevented by the configuration of the present invention.

When the concave surfaces of the first and second lenses oppose each other, the occurrence of spherical aberration and coma is reduced.

When the convex surface of the second lens is directed onto the object side, spherical aberration and coma may deteriorate so that it becomes difficult to correct them. Though they may be corrected by increasing the number of lens sheets, it increases the size and cost of the lens. Also, it becomes difficult to secure a space (back focus) for inserting a low-pass filter, an infrared cut filter, and the like.

The third lens acts to converge a luminous flux, thereby obtaining an appropriate focal length and correcting the image surface placed in an over state by the first and second lenses to an under state.

BRIEF DESCRIPTION OF THE DRAWINGS

FIG. 1 is a schematic view showing a basic lens configuration in accordance with Example 1 of the present invention;

FIG. 2 is a schematic view showing a basic lens configuration in accordance with Example 2 of the present invention;

FIGS. 3A, 3B, and 3C are aberration charts (for spherical aberration, astigmatism, and distortion) of the lens in accordance with Example 1; and FIGS. 4A, 4B, and 4C are aberration charts (for spherical aberration, astigmatism, and distortion) of the lens in accordance with Example 2.

DESCRIPTION OF THE PREFERRED EMBODIMENTS

In the following, embodiments of the present invention will be explained with reference to Examples 1 and 2.

EXAMPLE 1

FIG. 1 shows a basic lens configuration in accordance with Example 1. As shown in FIG. 1, the imaging lens in accordance with Example 1 comprises, successively from the object side, a first lens $L_1$ in a low-power (positive refracting power) meniscus form made of a plastic having a convex surface directed onto the object side, whose both surfaces are aspherical; a second lens $L_2$ in a low-power (negative refracting power) meniscus form made of a plastic having a concave surface directed onto the object side, whose both surfaces are aspherical; and a third lens $L_3$ in a meniscus form made of a glass with a positive refracting power having a convex surface directed onto the object side. A luminous flux incident on the imaging lens from the object side along an optical axis X forms an image on an imaging surface (light-receiving surface of a solid-state imaging device) 1.

On the image side of the third lens $L_3$, a space for placing a non-depicted filter section including an infrared filter and a low-pass filter is secured.

Though the third lens $L_3$ may be constituted by a plastic lens when performances on the order of those conventionally obtained are to be secured, it would become hard to secure appropriate temperature compensation thereby, thus making it difficult to achieve the object of the present invention.

The upper part of Table 1 (follows) shows radius of curvature R (mm) of each lens surface, center thickness of each lens and air gap between neighboring lenses D (mm), and refractive index n and Abbe number ν of each lens at d-line in Example 1.

In Table 1 and Table 3 which will be mentioned later, numbers corresponding to each of letters R, D, n, and ν successively increase from the object side. Each surface indicated by "*" refers to an aspheric surface, which is represented by the aspherical expression indicated by the following expression 1.

Expression 1
Aspherical expression $$Z=Cy^2/(1+(1-KC^2y^2)^{1/2})+A_4y^4+A_6y^6+A_8y^8+A_{10}y^{10}$$

wherein $C=1/R$

C: curvature of the apex of the aspheric surface
K: conical constant
$A_4$ to $A_{10}$: aspheric surface constant
y: height from the optical axis
Z: distance to a point on the aspheric surface from a tangential plane at the apex of the lens surface.

Table 2 (follows) shows coefficients concerning the respective aspheric surfaces.

As shown in the lower part of Table 1, the focal length f, F number, and angle of view 2ω of the whole lens system are 5.41 mm, 2.80, and 43.0 degrees, respectively.

EXAMPLE 2

Though being configured substantially the same as the imaging lens of Example 1, the imaging lens in accordance with Example 2 differs therefrom in that the second lens L2 has a weak positive refracting power.

The upper part of Table 3 (follows) shows radius of curvature R (mm) of each lens surface, center thickness of each lens and air gap between neighboring lenses D (mm), and refractive index n and Abbe number ν of each lens at d-line in Example 2. Each surface indicated by "*" refers to an aspheric surface, which is represented by the aspherical expression indicated by the above-mentioned expression 1.

Table 4 (follows) shows coefficients concerning the respective aspheric surfaces.

As shown in the lower part of Table 3, the focal length f, F number, and angle of view 2ω of the whole lens system are 5.41 mm, 2.80, and 43.2 degrees, respectively.

FIGS. 3(3A to 3C) and 4(4A to 4C) show various kinds of aberration (spherical aberration, astigmatism, and distortion) in the above-mentioned Examples 1 and 2, respectively. In these aberration charts, ω indicates the half angle of view. As can be seen from FIGS. 3(3A to 3C) and 4(4A to 4C), each kind of aberration can be made favorable in accordance with these examples.

Between the imaging lens and the imaging surface (light-receiving surface of the solid-state imaging device) 1, a cover glass may be inserted together with a low-pass filter and an infrared cut filter.

As explained in the foregoing, in the imaging lens in accordance with the present invention, while the first and second lenses are made as plastic lenses, their power is weakened so that a major part of power is carried by the third lens. Accordingly, while a compact three-sheet lens configuration is attained, focus fluctuation upon changes in temperature can be suppressed. Thus, it can be made favorable as the imaging lens for a video camera or the like for TV phone, door phone, monitoring purposes, and so forth.

Also, since each of the first and second lenses has at least one aspheric surface, a simple three-sheet lens configuration is attained. As these two lenses are made as plastic lenses, the aspheric surfaces can be made easily and inexpensively.

Since the respective concave surfaces of the first and second lenses oppose each other, the occurrence of various kinds of aberration such as spherical aberration, coma, and distortion can be reduced, while the lens system is made compact.

TABLE 1

| Surface | R | D | $N_d$ | $v_d$ |
|---|---|---|---|---|
| *1 | 2.1303 | 1.00 | 1.49018 | 57.8 |
| *2 | 2.1340 | 0.52 | | |
| *3 | −2.2118 | 1.00 | 1.49018 | 57.8 |
| *4 | −2.2079 | 0.20 | | |
| 5 | 3.7211 | 3.35 | 1.74330 | 49.2 |
| 6 | 5.9005 | | | | f = 5.41  Fno = 2.80  2ω = 43.0°

TABLE 2

| Surface | K | $A_4$ | $A_6$ | $A_8$ | $A_{10}$ |
|---|---|---|---|---|---|
| 1 | 1.00000 | $-1.796741 \times 10^{-3}$ | $-1.628679 \times 10^{-6}$ | $-2.884838 \times 10^{-9}$ | $-1.783263 \times 10^{-11}$ |
| 2 | 1.00000 | $4.585250 \times 10^{-4}$ | $3.061548 \times 10^{-8}$ | $-2.756530 \times 10^{-9}$ | $-1.782600 \times 10^{-11}$ |
| 3 | 1.00000 | $-1.139527 \times 10^{-3}$ | $-1.040482 \times 10^{-6}$ | $-2.819457 \times 10^{-9}$ | $-1.782867 \times 10^{-11}$ |
| 4 | 1.00000 | $7.396660 \times 10^{-3}$ | $7.396606 \times 10^{-7}$ | $-2.722668 \times 10^{-9}$ | $-1.782451 \times 10^{-11}$ |

TABLE 3

| Surface | R | D | $N_d$ | $v_d$ |
|---|---|---|---|---|
| *1 | 3.4533 | 0.80 | 1.49018 | 57.8 |
| *2 | 3.5023 | 1.23 | | |
| *3 | -2.2603 | 1.58 | 1.49018 | 57.8 |
| *4 | -2.2727 | 0.20 | | |
| 5 | 3.5310 | 2.94 | 1.74330 | 49.2 |
| 6 | 4.5618 | | | | f = 5.41 Fno = 2.80 2ω = 43.2°

TABLE 4

| Surface | K | $A_4$ | $A_6$ | $A_8$ | $A_{10}$ |
|---|---|---|---|---|---|
| 1 | 1.00000 | $-2.622199 \times 10^{-3}$ | $-1.172230 \times 10^{-5}$ | $-2.432723 \times 10^{-9}$ | $-1.155888 \times 10^{-11}$ |
| 2 | 1.00000 | $-1.710719 \times 10^{-3}$ | $5.536147 \times 10^{-6}$ | $-1.319000 \times 10^{-9}$ | $-1.157214 \times 10^{-11}$ |
| 3 | 1.00000 | $2.069173 \times 10^{-3}$ | $-4.753103 \times 10^{-6}$ | $-2.136551 \times 10^{-9}$ | $-1.162078 \times 10^{-11}$ |
| 4 | 1.00000 | $7.432929 \times 10^{-3}$ | $-9.714790 \times 10^{-6}$ | $-1.018238 \times 10^{-9}$ | $-1.155505 \times 10^{-11}$ |

What is claimed is:

1. An imaging lens, the first three lenses consisting successively from an object side, a first lens in a low-power meniscus form made of plastic, with a convex surface directed onto the object side, having at least one aspheric surface; a second lens in a low-power meniscus form made of plastic, with a concave surface directed onto the object side, having at least one aspheric surface; and a third lens having a positive refracting power made of glass.

2. An imaging lens according to claim 1, wherein said first and second lenses respectively have concave surfaces opposing each other.

3. An imaging lens according to claim 1, wherein said third lens is a meniscus lens having a convex surface directed onto the object side.

* * * * *